(12) United States Patent
Kim

(10) Patent No.: US 7,100,726 B2
(45) Date of Patent: Sep. 5, 2006

(54) APPARATUS FOR CONTROLLING DISTANCE BETWEEN VEHICLES

(75) Inventor: Jee Young Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 262 days.

(21) Appl. No.: 10/746,927

(22) Filed: Dec. 23, 2003

(65) Prior Publication Data

US 2004/0238249 A1    Dec. 2, 2004

(30) Foreign Application Priority Data

May 29, 2003    (KR) .................... 10-2003-0034409

(51) Int. Cl.
*G05D 1/00* (2006.01)
(52) U.S. Cl. .................... 180/169; 701/96; 342/70
(58) Field of Classification Search ................ 180/167, 180/169, 178, 179; 342/69, 70, 71; 701/96, 701/93
See application file for complete search history.

(56) References Cited

U.S. PATENT DOCUMENTS

| | | | | |
|---|---|---|---|---|
| 5,166,681 A | * | 11/1992 | Bottesch et al. ............ 340/933 |
| 5,463,384 A | * | 10/1995 | Juds ............................ 340/903 |
| 5,754,123 A | * | 5/1998 | Nashif et al. ............... 340/903 |
| 5,933,109 A | * | 8/1999 | Tohya et al. ................ 342/175 |
| 5,940,011 A | * | 8/1999 | Agravante et al. .......... 340/903 |
| 6,038,496 A | * | 3/2000 | Dobler et al. ................ 701/3 |
| 6,061,001 A | * | 5/2000 | Sugimoto .................... 340/903 |
| 6,157,892 A | * | 12/2000 | Hada et al. ................. 701/301 |
| 6,363,311 B1 | * | 3/2002 | Kuroda et al. ............... 701/96 |
| 6,363,326 B1 | * | 3/2002 | Scully ......................... 701/301 |
| 6,580,385 B1 | * | 6/2003 | Winner et al. ............... 342/70 |
| 6,611,227 B1 | * | 8/2003 | Nebiyeloul-Kifle et al. 342/173 |
| 6,615,137 B1 | * | 9/2003 | Lutter et al. ................ 701/301 |
| 6,657,581 B1 | * | 12/2003 | Lippert et al. .............. 342/70 |
| 6,727,844 B1 | * | 4/2004 | Zimmermann et al. ....... 342/70 |
| 6,748,312 B1 | * | 6/2004 | Russell et al. ............... 701/96 |
| 6,778,897 B1 | * | 8/2004 | Ibrahim ....................... 701/96 |
| 6,814,171 B1 | * | 11/2004 | Polak ........................... 180/169 |
| 2005/0043879 A1 | * | 2/2005 | Desens et al. ............... 701/96 |

FOREIGN PATENT DOCUMENTS

| | | |
|---|---|---|
| JP | 05-221252 | 8/1993 |
| JP | 07-017342750 | 1/1995 |
| KR | 1998-040970 | 9/1998 |
| WO | WO 00/73818 A1 | 12/2000 |

* cited by examiner

*Primary Examiner*—Jeff Restifo
(74) *Attorney, Agent, or Firm*—Morgan Lewis & Bockius LLP

(57) ABSTRACT

A vehicular distance to a preceding vehicle is controlled on the basis of a mixed combination of a longer range radar sensor and shorter range microwave sensors.

4 Claims, 3 Drawing Sheets

APPARATUS FOR CONTROLLING DISTANCE BETWEEN VEHICLES

CROSS-REFERENCE TO RELATED APPLICATIONS

This application claims priority of Korean Application No. 10-2003-0034409, filed on May 29, 2003, the disclosure of which is incorporated fully herein by reference.

FIELD OF THE INVENTION

The present invention relates to an apparatus for controlling distance between running vehicles.

BACKGROUND OF THE INVENTION

In general, apparatus for controlling distance between vehicles have progressed to the state of an adaptive cruise control (ACC) system, which can control the speed of a vehicle at high running speeds in the presence of a preceding vehicle a long distance away. However, the distance to a closely preceding vehicle has a dynamic characteristic at low speeds, that is, a following vehicle must frequently accelerate and/or decelerate. Considering such a fact, realizing stable control of a vehicle speed is more difficult when a vehicle is running at low speed than at high speed.

Furthermore, the sensor for detecting distance to a preceding vehicle, which provides a key factor to determine whether a vehicle should be accelerated or decelerated, usually does not cover distances from a short range to a long range. A typical long range radar sensor usually has an applicable range of 10–150 m, and a short range radar sensor having a range of 0.2m~20 m is only under investigation. Currently, a stable short range radar sensor is hard to find. In aspects of price and/or weight, such a short range radar sensor is not appropriate to be mounted together with a long range radar sensor.

For reference, in order to enable obtaining of a relative distance, a short range radar sensor is required to provide features of measuring distance and angle. A feature of measuring relative speed is further preferably required for controlling distance to a close object. A required range of the measuring is, e.g., 0.2~20 m with respect to distance, and ±20 deg with respect to angle.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

An exemplary apparatus for controlling vehicular distance, i.e., the distance between vehicles according to an embodiment of the present invention includes a vehicle running state detection unit, a first vehicular distance detection unit, a second vehicular distance detection unit, a vehicular distance controller, and a distance controlling actuator unit.

The vehicle running state detection unit detects the running state of the vehicle in which it is installed. The first vehicular distance detection unit detects a first distance to a forwardly preceding vehicle, wherein the first vehicular distance detection unit is mounted in a front center of the vehicle. The second vehicular distance detection unit detects a second distance to the forwardly preceding vehicle, wherein the second distance is detected with respect to positions having their center in line with the front center of the vehicle. The vehicular distance controller determines existence of the forwardly preceding vehicle on the basis of the first and second distances, and controls the running state of the vehicle on the basis of the existence of the forwardly preceding vehicle. The distance controlling actuator unit controls a vehicular distance to the forwardly preceding vehicle by adjusting the running state of the vehicle under control of the vehicular distance controller.

It is preferable that the first vehicular distance detection unit comprises at least one long range radar sensor and that the second vehicular distance detection unit comprises at least one short range microwave sensor.

It is further preferable that an exemplary apparatus for controlling vehicular distance according to an embodiment of the present invention further includes third and fourth vehicular distance detection units for detecting third and fourth distances to a laterally preceding vehicle. The third and fourth distances are detected in a laterally biased forward direction of the vehicle, and the third and fourth vehicular distance detection units are respectively disposed at left and right front corners of the vehicle.

It is preferable that the third and fourth vehicular distance detection units respectively comprise at least one short range microwave sensor.

It is preferable that the vehicular distance controller determines existence of the laterally preceding vehicle based on the third and fourth distances and controls the running state of the vehicle further based on the existence of the laterally preceding vehicle.

Embodiments of the present invention thus provide an apparatus for controlling vehicular distance having non-limiting advantages of enlarged scope in its operating distance and versatility of usage.

BRIEF DESCRIPTION OF THE DRAWINGS

The accompanying drawings, which are incorporated in and constitute a part of the specification, illustrate, an embodiment of the invention, and, together with the description, serve to explain the principles of the invention.

DETAILED DESCRIPTION OF THE PREFERRED EMBODIMENTS

Figure 1:
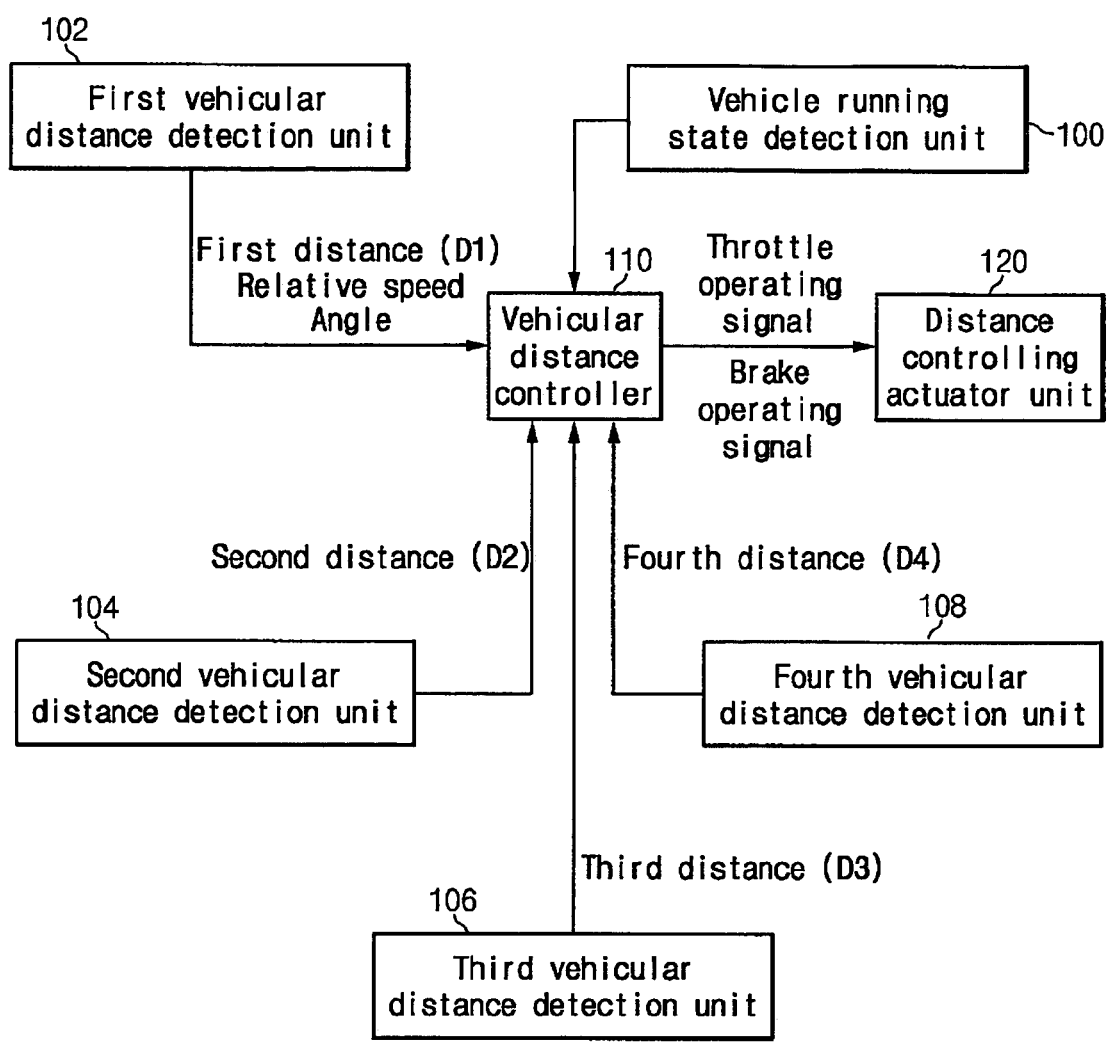
FIG. 1 is a block diagram of an apparatus for controlling a vehicular distance of a vehicle according to an embodiment of the present invention.

A preferred embodiment of the present invention will hereinafter be described in detail with reference to the accompanying drawings.

An apparatus for controlling a vehicular distance according to an embodiment of the present invention includes a vehicle running state detection unit 100, a first vehicular distance detection unit 102, a second vehicular distance detection unit 104, a vehicular distance controller 110, and a distance controlling actuator unit 120.

The vehicle running state detection unit 100 detects the running state of the vehicle in which it is installed, and may include a plurality of sensors such as a vehicle speed sensor and an engine speed sensor. The running state of the vehicle detected at the vehicle running state detection unit 100 is sent to the vehicular distance controller 110.

Figure 2:
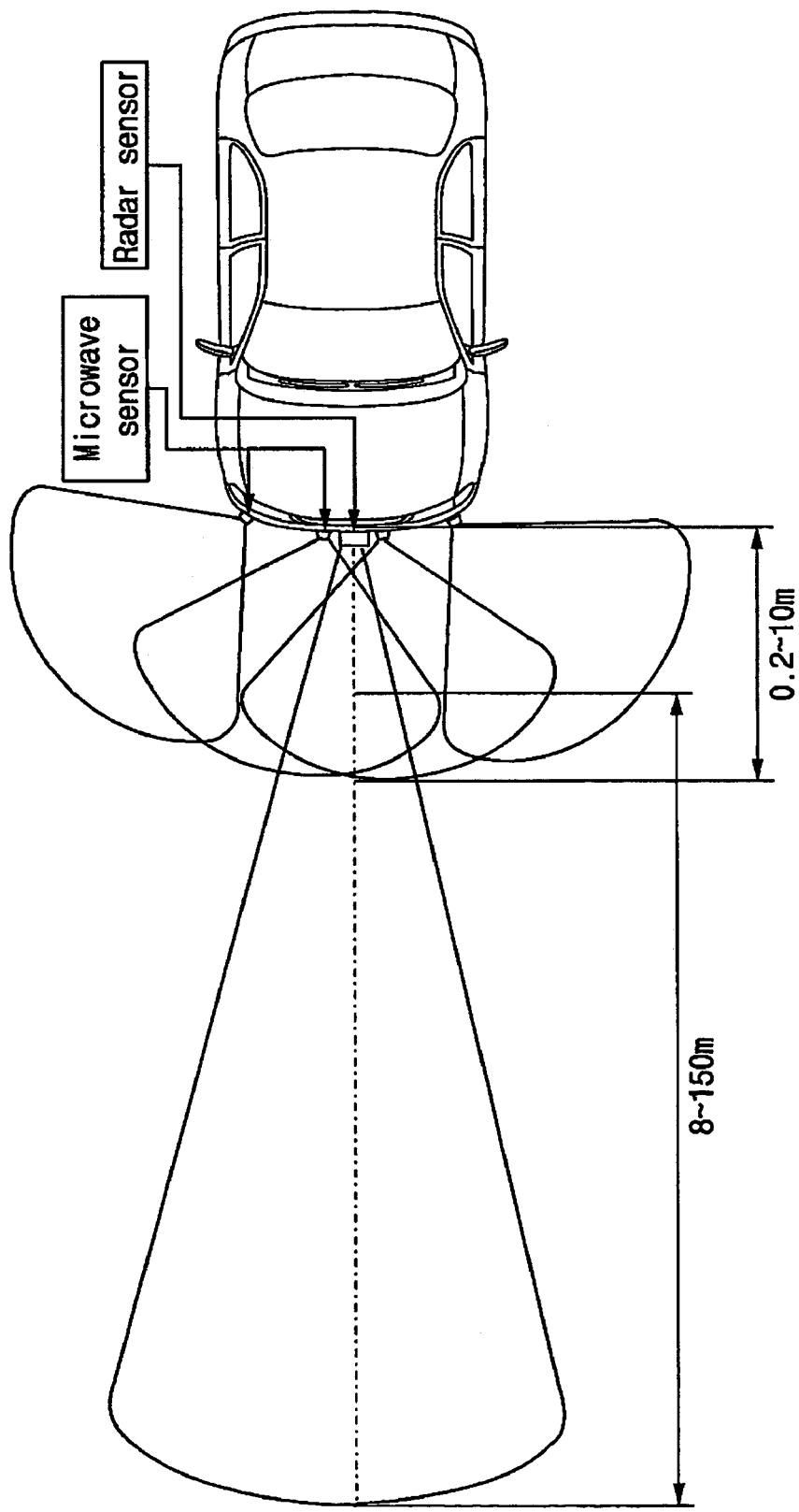
FIGS. 2 and 3 illustrate mounting positions and detection ranges of vehicular distance detection units adopted in an apparatus for controlling a vehicular distance of a vehicle according to an embodiment of the present invention.

The first vehicular distance detection unit 102 detects a first distance D1 to a forwardly preceding vehicle. As shown in FIG. 2, the first vehicular distance detection unit 102 is mounted in a front center of the vehicle such as at a center of a front bumper or a radiator grill. The first vehicular distance detection unit 102 includes at least one long range radar sensor such that the first distance D1 is obtained in a long range of e.g., 8–150 m.

The second vehicular distance detection unit 104 detects a second distance D2 to the forwardly preceding vehicle. The second distance is detected with respect to positions having their center in line with the front center of the vehicle. The second vehicular distance detection unit 104 includes at least one short range microwave sensor such that the second distance D2 is obtained in a short range of e.g., 0.2–10 m. In a preferred embodiment, the second vehicular distance detection unit 104 includes at least two short range microwave sensors that are disposed at positions symmetrical with respect to the mounting position of the first vehicular distance detection unit 102.

The vehicular distance controller 110 receives signals from the first and second vehicular distance detection units 102 and 104 and determines existence of the forwardly preceding vehicle on the basis of the first distance D1 and the second distance D2. The vehicular distance controller 110 accordingly controls the running state of the vehicle on the basis of the existence of the forwardly preceding vehicle such that a vehicular distance to the forwardly preceding vehicle may be controlled.

The vehicular distance controller 110 can be realized by one or more processors activated by a predetermined program, and the predetermined program can be programmed by a person of ordinary skill in the art based on the teaching set forth herein to perform each step for controlling vehicular distance as shown in Tables 1-1 and 1-2.

The distance controlling actuator unit 120 controls, under the control of the vehicular distance controller 110, the running state of the vehicle and thereby adjusts the vehicular distance to the forwardly preceding vehicle.

The distance controlling actuator unit 120 includes at least one actuator for controlling the running state of the vehicle, and in this embodiment, it includes an actuator for adjusting a throttle opening and an actuator for braking the vehicle. Therefore, the vehicular distance controller 110 can accelerate or decelerate the vehicle by controlling the distance controlling actuator unit 120.

An apparatus for controlling a vehicular distance of a vehicle according to a preferred embodiment of the present invention further includes third and fourth vehicular distance detection units 106 and 108 for detecting third and fourth distances to a laterally preceding vehicle.

Figure 3:
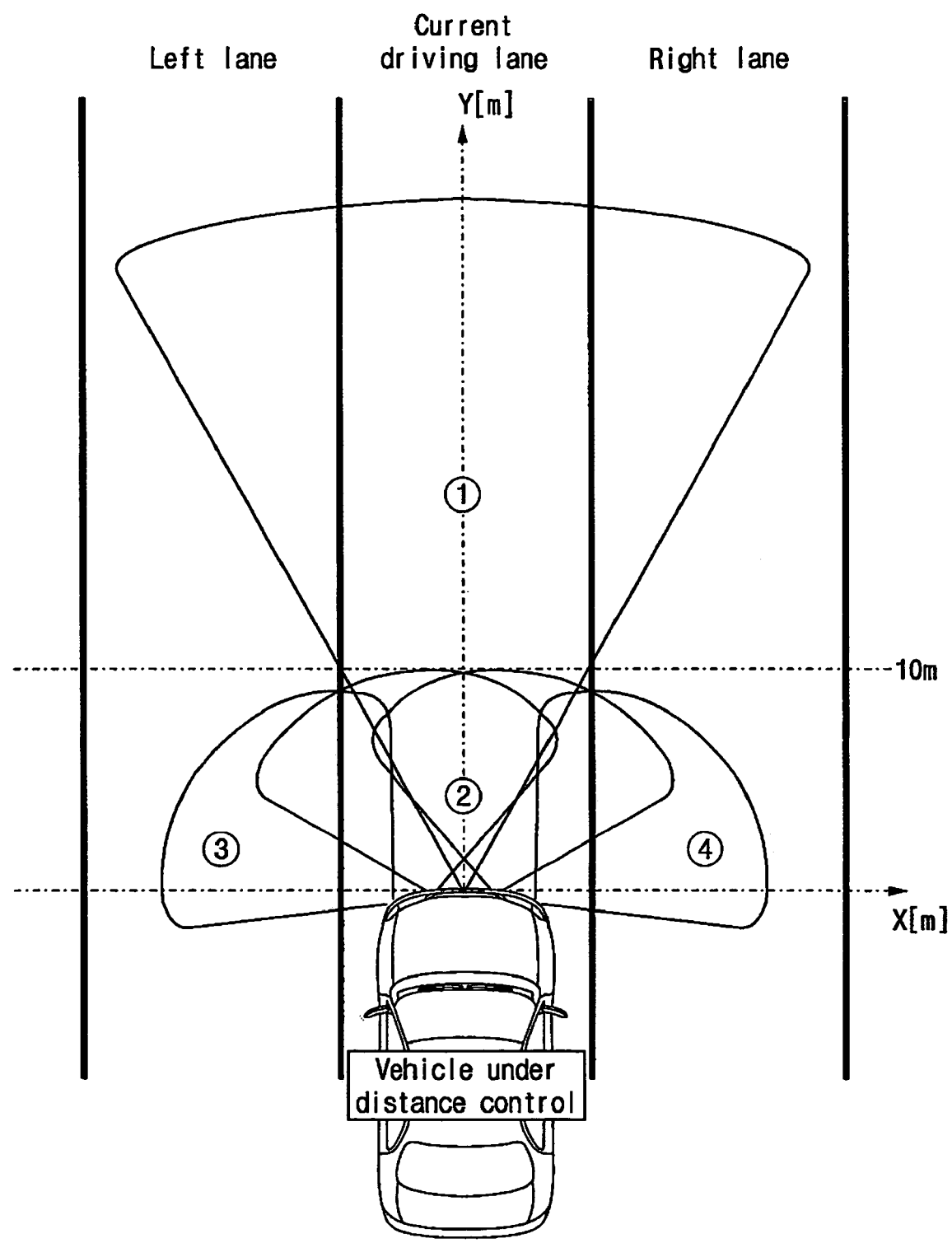

The third and fourth vehicular distance detection units 106 and 108 are respectively disposed at left and right front corners of the vehicle as shown in FIGS. 2 and 3. The third and fourth distance D3 and D4 are detected in a laterally biased forward direction of the vehicle. The third and fourth vehicular distance detection units 106 and 108 respectively comprise at least one short range microwave sensor.

The vehicular distance controller 110 determines existence of the laterally preceding vehicle based on the third and fourth distances D3 and D4, and controls the running state of the vehicle further based on the existence of the laterally preceding vehicle.

Operation of an apparatus for controlling a vehicular distance according to an embodiment of the present invention is hereinafter described in detail with reference to FIGS. 1 to 4.

In an embodiment of the present invention, as described above, the first vehicular distance detection unit 102, which includes a radar sensor, is used for long range detection of a forwardly preceding vehicle, and the second, third, and fourth vehicular distance detection units 104–108, which respectively include a microwave sensor, are used for short range detection of a forwardly or laterally preceding vehicle. A vehicular distance to the forwardly or laterally preceding vehicle is controlled, depending on the running speed of the vehicle, according to the distance thereto.

Firstly, the first vehicular distance detection unit 102, which may be realized as a radar sensor of a long range of e.g. 8–150 m, is mounted in a front center of the vehicle such as at a center of a front bumper or a radiator grill. The first vehicular distance detection unit 102 detects a forwardly preceding vehicle in a region ① shown in FIG. 3.

The second vehicular distance detection unit 104 is also mounted in front of the vehicle, such that the two microwave sensors included therein are disposed symmetrically to both sides of the first vehicular distance detection unit 102. The second vehicular distance detection unit 104 detects a forwardly preceding vehicle in a region ② shown in FIG. 3.

The third and fourth vehicular distance detection units 106 and 108, which are realized as microwave sensors with a short range, are respectively mounted at left and right corners of the front bumper. The third and fourth vehicular distance detection units 106 and 108 respectively detect a laterally preceding vehicle in regions ③ and ④ shown in FIG. 3.

As described above, the vehicular distance controller 110 respectively receives the first, second, third, and fourth distances D1, D2, D3, and D4 from the first, second, third, and fourth vehicular distance detection units 102, 104, 106, and 108, and determines a parameter (such as throttle opening and braking pedal pressure) for controlling a current running state of a vehicle. In more detail, the vehicular distance controller 110 determines, on the basis of the first to fourth distances D1 to D4, whether a forwardly or laterally preceding vehicle exists, and accordingly, executes a control operation according to predetermined control patterns shown in the following tables 1-1 and 1-2.

In the following tables, O denotes that a distance to a preceding vehicle is obtained, and X denotes that a distance to a preceding vehicle is not obtained.

TABLE 1-1

| D1 | D2 | D3 | D4 | Control pattern |
|---|---|---|---|---|
| O | O | O | O | Comparing D1 and D2, |
| O | O | O | X | if they are equal: short distance control (SG) |
| O | O | X | O | if they are not equal: short distance control (SG) based on a smaller one of D1 and D2 (Bigger one is set as a GHOST value) Comparing D2 with D3 (or/and D4), if D2 > D3: brake control. |
| O | O | X | X | Comparing D1 and D2, if they are equal: short distance control (SG) if they are not equal: short distance control (SG) based on a smaller one of D1 and D2 (Bigger one is set as a GHOST value). |
| O | X | X | X | Adaptive cruise control (ACC) with reference to D1. |
| O | X | O | O | Adaptive cruise control (ACC) with reference to D1. |
| O | X | O | X | Follow trajectory of laterally preceding vehicle |
| O | X | X | O | (brake control when needed). |

TABLE 1-2

| D1 | D2 | D3 | D4 | Control pattern |
|----|----|----|----|-----------------|
|    |    | ○  | ○  | Short distance control (SG) |
| X  | ○  | ○  | X  | Comparing D2 with D3 (or/and D4), |
|    |    | X  | ○  | if D2 > D3: brake control. |
| X  | ○  | X  | X  | Short distance control (SG) |
|    |    | ○  | ○  | Conventional Cruise Control |
| X  | X  | ○  | X  | Follow trajectory of laterally preceding vehicle |
|    |    | X  | ○  | (brake control when needed). |
| X  | X  | X  | X  | Conventional Cruise Control |

Tables 1-1 and 1-2 show control patterns depending on detected distances D1–D4 according to an embodiment of the present invention.

Referring to tables 1-1 and 1-2, the speed control of the vehicle according to the controller 110 depends on existence of a long distance value (D1) and short distance value (D2), and their difference.

In the above tables, ACC denotes an adaptive cruise control with reference to a preceding vehicle at a long distance. That is, ACC implies that the speed control of the current vehicle is performed on the basis of the first distance D1.

In the above tables, SG denotes a speed control with reference to a preceding vehicle at a short distance. That is, SG implies that the speed control of the current vehicle is performed on the basis of the second distance D2.

In addition, based on a difference between short range distances (i.e., between D2 and D3 and/or D2 and D4), the current running state of the vehicle is controlled (e.g., decelerated) such that incidence with a laterally preceding vehicle is prevented.

For example, when the current vehicle is required to follow a forwardly preceding vehicle, the vehicular distance controller 110 calculates a required acceleration/deceleration by analyzing vehicle speeds of the current vehicle and the preceding vehicle, and accordingly activates the distance controlling actuator unit 120 on the basis of the required acceleration/deceleration.

Accordingly the distance controlling actuator unit 120 accelerates or decelerates the current vehicle, under the control of the vehicular distance controller 110, such that a vehicular distance to the forwardly preceding vehicle is controlled.

For reference, regarding the distance values input to the vehicular distance controller 110, priority is given in the order of the second distance D2 for short range central distance in a current driving lane, the first distance D1 for long range central distance in a current driving lane, and then the third and fourth distance D3 and D4 for short range distances laterally biased to an adjacent driving lane.

The short range distances laterally biased to an adjacent driving lane is not directly used while the vehicle is controlled to follow a preceding vehicle. However it is considered to enable escaping from an accident in the case in which a laterally preceding vehicle suddenly changes its lane and enters the current driving lane of the current vehicle.

In this case, the vehicular distance controller 110 may execute braking of the current vehicle. That is, under the control of the vehicular distance controller 110, the distance controlling actuator unit 120 controls the running state of a vehicle such that a vehicular distance to the laterally preceding vehicle is maintained above a minimal standard.

Each control pattern according to each combination of the distances D1–D4 is hereinafter described in detail.

The following table 2 relates to a case in which vehicular distances D1 and D2 to at least one forwardly preceding vehicle are respectively obtained by the first and second vehicular distance detection units 102 and 104, and at least one short range distance D3 or D4 is obtained by the third and fourth vehicular distance detection units 106 and 108.

TABLE 2

| D1 | D2 | D3 | D4 | Control pattern |
|----|----|----|----|-----------------|
|    |    | ○  | ○  | Comparing D1 and D2, |
| ○  | ○  | ○  | X  | if they are equal: short distance control (SG) |
|    |    | X  | ○  | if they are not equal: short distance control (SG) based on a smaller one of D1 and D2 (Bigger one is set as a GHOST value) Comparing D2 with D3 (or/and D4), if D2 > D3: brake control. |

In this case, the vehicular distance controller 110 compares the detected first and second distances D1 and D2.

When the first and second distances D1 and D2 are equal, the vehicular distance controller 110 controls the vehicular distance of the current vehicle on the basis of a predetermined short distance control to the forwardly preceding vehicle.

When the first and second distances D1 and D2 are not equal, the vehicular distance controller 110 controls the vehicular distance of the current vehicle on the basis of a predetermined short distance control to the forwardly preceding vehicle based on a smaller one of the distances D1 and D2. In this case, a bigger one of them is set as a GHOST value.

During such a distance control of the current vehicle, when a distance shorter than the second distance D2 is detected by either of the third and fourth vehicular distance detection units 106 and 108, the vehicular distance controller 110 decelerates the vehicle by a braking operation of the vehicle by way of controlling the distance controlling actuator unit 120.

The following table 3 relates to a case in which vehicular distances D1 and D2 to at least one forwardly preceding vehicle are respectively obtained by the first and second vehicular distance detection units 102 and 104 however, short range distances D3 are D4 are not obtained by either of the third and fourth vehicular distance detection units 106 and 108.

TABLE 3

| D1 | D2 | D3 | D4 | Control pattern |
|----|----|----|----|-----------------|
| ○  | ○  | X  | X  | Comparing D1 and D2, if they are equal: short distance control (SG) if they are not equal: short distance control (SG) based on a smaller one of D1 and D2 (Bigger one is set as a GHOST value) |

In this case, the vehicular distance controller 110 compares the detected first and second distances D1 and D2.

When the first and second distances D1 and D2 are equal, the vehicular distance controller 110 controls the vehicular distance of the current vehicle on the basis of a predetermined short distance control to the forwardly preceding vehicle.

When the first and second distances D1 and D2 are not equal, the vehicular distance controller 110 controls the vehicular distance of the current vehicle on the basis of a predetermined short distance control to the forwardly preceding vehicle based on a smaller one of the distances D1 and D2. In this case, a bigger one of them is set as a GHOST value.

The following table 4 relates to a case in which a first distances D1 a forwardly preceding vehicle is obtained by the first vehicular distance detection unit 102 and no other distances D2–D4 to a forwardly or laterally preceding vehicle are obtained by the second to fourth vehicular distance detection units 104, 106, and 108.

TABLE 4

| D1 | D2 | D3 | D4 | Control pattern |
|----|----|----|----|-----------------|
| ○  | X  | X  | X  | Adaptive cruise control (ACC) with reference to D1. |

In this case, the vehicular distance controller 110 controls vehicular distance of the current vehicle on the basis of the detected first distance D1.

The following table 5 relates to a case in which the first distance D1 to a forwardly preceding vehicle is detected by the first vehicular distance detection unit 102, the second distance D2 to a forwardly preceding vehicle is not detected by the second vehicular distance detection unit 104, and at least one short range distance D3 or D4 is obtained by the third and fourth vehicular distance detection units 106 and 108.

TABLE 5

| D1 | D2 | D3 | D4 | Control pattern |
|----|----|----|----|-----------------|
|    |    | ○  | ○  | Adaptive cruise control (ACC) with reference to D1. |
| ○  | X  | ○  | X  | Follow trajectory of laterally preceding vehicle |
|    |    | X  | ○  | (brake control when needed). |

In this case, the vehicular distance controller 110 basically controls vehicular distance of the current vehicle on the basis of the detected first distance D1.

In addition, the vehicular distance controller 110 controls the vehicle to follow a trajectory of the laterally preceding vehicle in its left and/or right sides such that distance therebetween does not become less than a predetermined distance. In this case, the vehicular distance controller 110 may decelerate the current vehicle.

The following table 6 relates to a case in which the first distance D1 to a forwardly preceding vehicle is not detected by the first vehicular distance detection unit 102, the second distance D2 to a forwardly preceding vehicle is detected by the second vehicular distance detection unit 104, and at least one short range distance D3 or D4 is obtained by the third and fourth vehicular distance detection units 106 and 108.

TABLE 6

| D1 | D2 | D3 | D4 | Control pattern |
|----|----|----|----|-----------------|
|    |    | ○  | ○  | Short distance control (SG) |
| X  | ○  | ○  | X  | Comparing D2 with D3 (or/and D4), |
|    |    | X  | ○  | if D2 > D3: brake control. |

In this case, the vehicular distance controller 110 controls vehicular distance of the current vehicle on the basis of the detected second distance D2.

During such a distance control of the current vehicle, when a distance shorter than the second distance D2 is detected by either of the third and fourth vehicular distance detection units 106 and 108, the vehicular distance controller 110 decelerates the vehicle by a braking operation of the vehicle by way of controlling the distance controlling actuator unit 120.

The following table 7 relates to a case in which the second distances D2 to a forwardly preceding vehicle is obtained by the second vehicular distance detection unit 104, and no other distances D1, D3, and D4 to a forwardly or laterally preceding vehicle are obtained by the first, third, and fourth vehicular distance detection units 102, 106, and 108.

TABLE 7

| D1 | D2 | D3 | D4 | Control pattern |
|----|----|----|----|-----------------|
| X  | ○  | X  | X  | Short distance control (SG) |

In this case, the vehicular distance controller 110 controls vehicular distance of the current vehicle on the basis of the detected second distance D2.

The following table 8 relates to a case in which vehicular distances D1 and D2 to a forwardly preceding vehicle are neither detected by the first and second vehicular distance detection units 102 and 104 but at least one short range distance D3 or D4 is obtained by the third and fourth vehicular distance detection units 106 and 108.

TABLE 8

| D1 | D2 | D3 | D4 | Control pattern |
|----|----|----|----|-----------------|
|    |    | ○  | ○  | Conventional Cruise Control, |
| X  | X  | ○  | X  | Follow trajectory of laterally preceding vehicle |
|    |    | X  | ○  | (brake control when needed). |

In this case, the vehicular distance controller 110 basically controls the vehicle according to a conventional cruise control method.

In addition, regarding the laterally preceding vehicle, the vehicular distance controller 110 controls the vehicle to follow a trajectory of the laterally preceding vehicle in its left and/or right sides such that distance therebetween does not become less than a predetermined distance. In this case, the vehicular distance controller 110 may decelerate the current vehicle.

The following table 9 relates to a case in which none of the distances D1–D4 is detected by the first to fourth vehicular distance detection units 102–108.

TABLE 9

| D1 | D2 | D3 | D4 | Control pattern |
|----|----|----|----|-----------------|
| X  | X  | X  | X  | Conventional Cruise Control |

In this case, the vehicular distance controller 110 basically controls the vehicle according to a conventional cruise control method.

As shown above, apparatus for controlling vehicular distance according to an embodiment of the present invention, by simultaneously utilizing a radar sensor for vehicle detection in a long range and microwave sensors for vehicle detection in a short range, an available distance scope in a vehicular distance control can be enlarged.

Considering that frequencies used in a radar sensor and a microwave sensor are substantially different from each other, (e.g., a normal frequency of a radar sensor is near 76 Ghz and that of a microwave sensor is near 40 Khz), wave interference is not substantial.

In addition, since a vehicular distance to a preceding vehicle is automatically controlled regardless of how far away the preceding vehicle is, drive comfort is enhanced.

Furthermore, usage of microwave sensors, which is lighter than a short range radar sensor, contributes to reducing overall weight of a vehicle.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for controlling distance to another vehicle from a first vehicle, comprising:
    a vehicle running state detection unit for detecting a running state of the first vehicle;
    a first vehicular distance detection unit for detecting a first distance to a forwardly preceding vehicle, the first vehicular distance detection unit being mounted in a front center of the first vehicle;
    a second vehicular distance detection unit for detecting a second distance to the forwardly preceding vehicle, the second distance being detected with respect to positions having a center in line with the front center of the first vehicle;
    third and fourth vehicular distance detection units, respectively disposed at left and right front corners of the first vehicle, that detect third and fourth distances to a laterally preceding vehicle, the third and fourth distances being detected in a laterally biased forward direction of the first vehicle;
    a vehicular distance controller
        that determines existence of the forwardly preceding vehicle based on the first distance and the second distance;
        that determines existence of the laterally preceding vehicle based on the third distance or the fourth distance; and
        that controls the running state of the first vehicle based on the existence of the forwardly preceding vehicle or the laterally preceding vehicle; and
    a distance controlling actuator unit for controlling distance to the forwardly preceding vehicle or the laterally preceding vehicle by adjusting the running state of the first vehicle under control of the vehicular distance controller;
        wherein the distance controlling actuator unit controls the distance to the laterally preceding vehicle when the third or the fourth distance is smaller than the first distance, the second distance, and a predetermined distance.

2. The apparatus of claim 1, wherein the first vehicular distance detection unit comprises at least one long range radar sensor.

3. The apparatus of claim 1, wherein the second vehicular distance detection unit comprises at least one short range microwave sensor.

4. The apparatus of claim 1, wherein the third and fourth vehicular distance detection units each comprise at least one short range microwave sensor.

* * * * *